US00RE45127E

(19) United States
(12) Reissued Patent
Needham et al.

(10) Patent Number: US RE45,127 E
(45) Date of Reissued Patent: *Sep. 9, 2014

(54) LOCATION-BASED VEHICLE MESSAGING SYSTEM

(75) Inventors: Bradford H. Needham, North Plains, OR (US); Anthony C. Salvador, Portland, OR (US); John W. Sherry, Portland, OR (US)

(73) Assignee: Intel Corporation, Santa Clara, CA (US)

( * ) Notice: This patent is subject to a terminal disclaimer.

(21) Appl. No.: 12/700,920

(22) Filed: Feb. 5, 2010

Related U.S. Patent Documents

Reissue of:
(64) Patent No.: 7,174,173
Issued: Feb. 6, 2007
Appl. No.: 09/243,701
Filed: Feb. 2, 1999

U.S. Applications:
(63) Continuation of application No. 11/901,689, filed on Sep. 18, 2007, which is an application for the reissue of Pat. No. 7,174,173.

(51) Int. Cl.
*H04W 24/00* (2009.01)

(52) U.S. Cl.
USPC ..... 455/456.2; 455/456.3; 455/457; 701/484; 701/516

(58) Field of Classification Search
USPC ..... 455/456.1–457; 701/207–215, 484, 516
See application file for complete search history.

(56) References Cited

U.S. PATENT DOCUMENTS

| | | | | | |
|---|---|---|---|---|---|
| 5,428,544 | A * | 6/1995 | Shyu | 701/117 |
| 5,699,056 | A * | 12/1997 | Yoshida | 340/905 |
| 5,727,057 | A | 3/1998 | Emery et al. | |
| 5,933,100 | A * | 8/1999 | Golding | 340/995.13 |
| 5,950,123 | A * | 9/1999 | Schwelb et al. | 455/414 |
| 5,999,126 | A * | 12/1999 | Ito | 342/357.1 |
| 6,012,012 | A * | 1/2000 | Fleck et al. | 701/117 |
| 6,028,537 | A | 2/2000 | Suman et al. | |
| 6,029,069 | A * | 2/2000 | Takaki | 455/456 |
| 6,061,561 | A * | 5/2000 | Alanara et al. | 455/422 |
| 6,073,075 | A * | 6/2000 | Kondou et al. | 701/203 |
| 6,108,534 | A * | 8/2000 | Bourgeois et al. | 455/419 |
| 6,125,279 | A * | 9/2000 | Hyziak et al. | 455/445 |
| 6,150,961 | A * | 11/2000 | Alewine et al. | 340/995.1 |
| 6,169,955 | B1 * | 1/2001 | Fultz | 701/200 |
| 6,519,463 | B2 | 2/2003 | Tendler | |
| 6,791,472 | B1 * | 9/2004 | Hoffberg | 340/905 |
| 2002/0082770 | A1 * | 6/2002 | Jones | 701/201 |
| 2002/0198632 | A1 * | 12/2002 | Breed et al. | 701/1 |
| 2003/0060211 | A1 | 3/2003 | Chern et al. | |
| 2003/0069029 | A1 | 4/2003 | Dowling et al. | |

* cited by examiner

*Primary Examiner* — Temica M Beamer
(74) *Attorney, Agent, or Firm* — Trop, Pruner & Hu, P.C.

(57) ABSTRACT

A system may enable vehicle operators to request information automatically along the route of travel by transmitting information requests, tied to the vehicle's current position, to a server. The server may store a plurality of informational files associated with particular global positioning system coordinates. Upon receipt of a request, the files associated with a particular position may be located and transmitted to the vehicle. The files may be stored as audio files so the user may listen to the files without being distracted while driving the vehicle.

22 Claims, 4 Drawing Sheets

LOCATION-BASED VEHICLE MESSAGING SYSTEM

Matter enclosed in heavy brackets [ ] appears in the original patent but forms no part of this reissue specification; matter printed in italics indicates the additions made by reissue.

*CROSS-REFERENCE TO RELATED APPLICATIONS*

*This reissue application is a continuation reissue application of U.S. patent application Ser. No. 11/901,689, filed on Sep. 18, 2007, which is a Reissue of Ser. No. 09/243,701 filed Feb. 2, 1999, now U.S. Pat. No. 7,174,173 and this continuation reissue application is related to a continuation reissue application of U.S. Pat. No. 7,174,173, Ser. No. 12/505,776, filed on Jul. 20, 2009.*

BACKGROUND

This invention relates generally to providing information to vehicles, based on their position.

As the vehicles move down highways and other roads, they encounter a variety of circumstances which may be relevant to other drivers. For example, one driver may pass a location where traffic is congested, an accident has occurred or road construction is ongoing. A driver currently has no way to broadcast that information to other drivers traversing the same route.

If other drivers were aware of the conditions ahead, they could make alternate routing plans to avoid the problem. Armed with this information, other drivers could make on-the-go decisions about the best route to take.

Existing systems provide information related to particular locations. For example, radio stations and television stations may provide information about road conditions, which tends to become outdated. Given the limited time that these stations have to broadcast this type of information, they are limited in how much information they can provide about the plethora of driving locations around their urban broadcast area.

Thus, there is a need for better ways to provide more information to more vehicle operators.

SUMMARY

In accordance with one embodiment, a method of obtaining information includes generating a signal indicative of a vehicle's position. The signal is transmitted to a base station. Information, stored at the base station in association with the vehicle's position, is then received from the base station.

DETAILED DESCRIPTION

Figure 1:
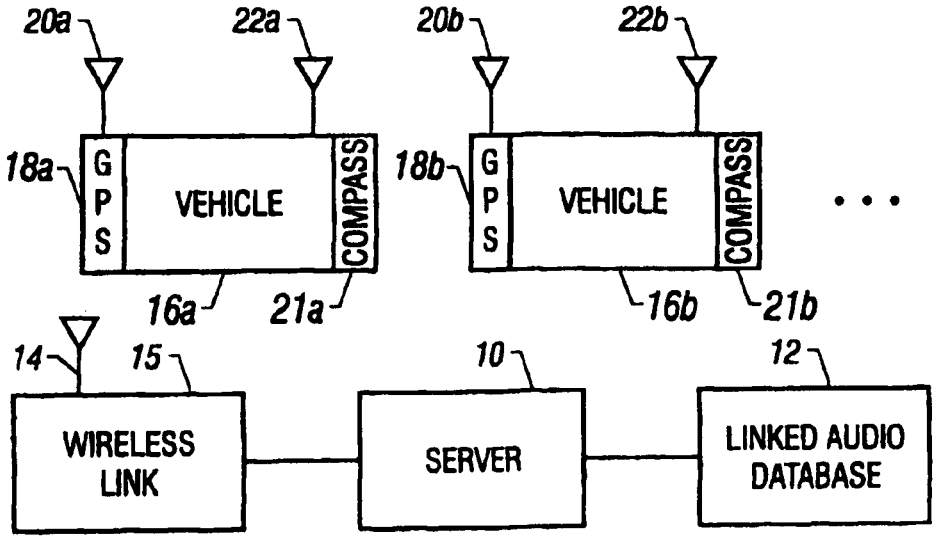
FIG. 1 is a block depiction of one system for implementing the present invention.

Referring to FIG. 1, a system for providing information to a plurality of vehicle operators, keyed to the location of those vehicles, includes a server 10 coupled with a wireless link 15 having an antenna 14. The wireless link 15 may implement a radio frequency based transmission system, such as that used in connection with digital cellular telephones. The wireless link 15 may be part of the server 10 or may be at a separate location. The wireless link 15 may be a telephone base station coupled to the server 10 over a network such as the Internet.

The server 10 may have associated with it a linked audio database 12, which includes information about a plurality of different locations tied to particular location coordinate information. For example, each of the database entries may, in one embodiment of the present invention, be an audio file linked to coordinates that may, for example, have been generated by the global positioning system (GPS).

The server 10 may communicate, for example, by radio or cellular telephone, with a plurality of vehicles 16, e.g., vehicles 16a and 16b shown in FIG. 1. Each of the vehicles may include an appropriate receiving antenna 22a or 22b. In addition, each vehicle may include its own position location system, e.g., a GPS system 18a and 18b, together with the appropriate antennas 20a and 20b.

In this way, the vehicles may request information from the server. Those requests may have appended GPS coordinate information. The server may then search its database 12 to find any audio files associated with the GPS position of the vehicle 16a, for example. If it finds such files, the server may transmit those files to the vehicle 16a so the operator can have the benefit of what others have recorded for a particular position along the roadway.

The information associated with a particular location may include descriptions of various driving conditions or information about sites along the way. In addition, messages may be stored for other drivers who may be known by a particular operator. For example, one operator may leave a message for another operator to turn at the next right turn.

In one embodiment of the present invention, each of the vehicles 16 may also include a compass, e.g., a digital compass 21, which provides direction information. In this way, only information associated with a given position and vehicle heading direction may be provided by the server. For example, vehicles traveling northbound on a given highway will receive information that was stored by northbound traveling vehicles and not by southbound traveling vehicles.

Figure 2:
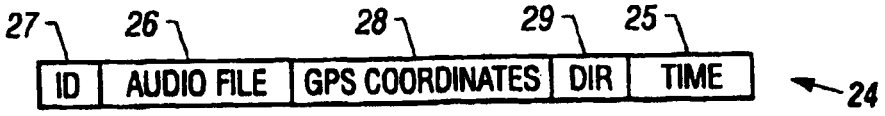
FIG. 2 is a depiction of a file structure useful in connection with the embodiment shown in FIG. 1.

Referring to FIG. 2, in accordance with one embodiment of the invention, the server may include a database 12, which includes data files 24. The files 24 may include text, video, or other data. For example, the files 24 may include audio files 26, which are essentially digital recordings of voice communications received from a variety of vehicles. Each of the audio files 26 may have associated coordinate information 28, which, in one embodiment of the present invention, may be GPS coordinate information.

In this way, each of the files 24 may be searched for particular GPS coordinates. All the files 26 associated with those coordinates which match the current position of a requesting vehicle may be transmitted to the vehicle.

Each of the files may also have a time stamp 25 so that after an amount of time, a file may be discarded. Thus, only relatively current information will be received by the vehicle for a given position. The files may also include a user name or a reply field to facilitate a response to the submitter. Other techniques used in bulletin board systems may also be used here.

Advantageously, the files 26 may also include a vehicle identifier 27, e.g., a telephone number. The file 24 may include not only the GPS coordinates 28, but also direction or compass information 29, which may also be transmitted by the vehicle 16 to the server 10.

While the present invention has been described with respect to a server which serves audio files, the server may also serve text-based files as well. Thus, a server may actually receive and send text-based files. If desired, these files may then be converted, using conventional text-to-speech or speech-to-text software to and from a spoken format.

In each case, it is not necessary for the coordinates to match exactly, but instead, a given tolerance can be provided for both the GPS coordinate information and the compass information. That is, if the position of the requesting vehicle is within a given tolerance of the position and direction of a file stored in the server, that information may be provided.

Figure 3:
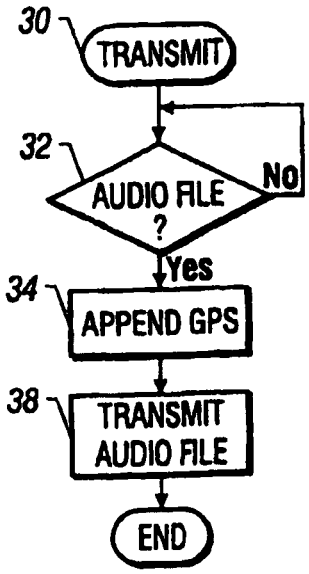
FIG. 3 is a flow chart for software implementing a transmit function at a vehicle in one embodiment.

Referring now to FIG. 3, software 30 for enabling a vehicle 16 to transmit information to the server 10 is illustrated. Initially, a check at diamond 32 determines whether an audio file has been prepared by the operator of the vehicle. If so, the current GPS coordinates may be appended to the file, as indicated at block 34. In addition, compass information may be appended as well, if desired. The file may then compressed and transmitted, as indicated in block 38, for receipt by the server 10. The transmission may be undertaken over a radio or cellular telephone communication link. Other communication links can be used as well.

Figure 4:
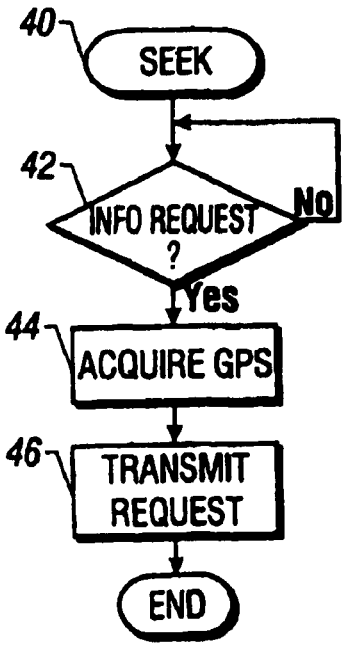
FIG. 4 is a flow chart for software implementing the seek function at a vehicle in one embodiment.

Referring now to FIG. 4, software 40 for enabling a vehicle operator to request information associated with a given file begins by determining whether or not an information request has been initiated, as indicated in diamond 42. If so, the current GPS coordinate position is acquired as indicated in block 44. The request is then transmitted, as indicated in block 46, together with the present position information, and if desired, the directional information.

Figure 5:
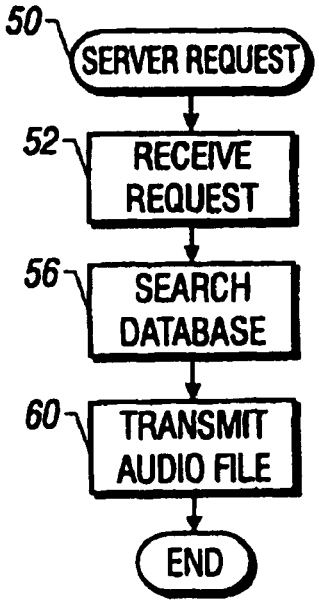
FIG. 5 is a flow chart of software at the server for handling a request from a vehicle for position-linked information in one embodiment.

Turning now to FIG. 5, the server may respond to a request for information linked to a particular location using the software 50. Initially, a check determines whether a request has been received from a vehicle as indicated in block 52. The database 12 is then searched (block 56) for other files which have matching GPS and compass/direction information.

The audio file (with or without the identifier) may then be compressed and transmitted to the vehicle as indicated in block 60. In a cellular phone system, the request may include the requester's cellular telephone number. Alternatively, the caller's telephone number may be obtained using a caller identity delivery (CID) system. The audio file may be subsequently transmitted using the telephone information without tying up the user's telephone any more than necessary.

Figure 6:
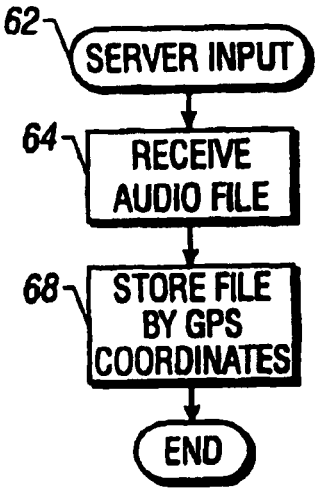
FIG. 6 is a flow chart of software on a server for receiving input information from a vehicle.

Moving on to FIG. 6, software 62 begins by receiving an audio file, as indicated in block 64, from a vehicle. The audio file may be decompressed. The file is then stored by GPS coordinates and/or compass direction information associated with the audio file, as indicated in block 68. Time stamp data may be appended or may be obtained from the GPS system in one embodiment.

Figure 7:
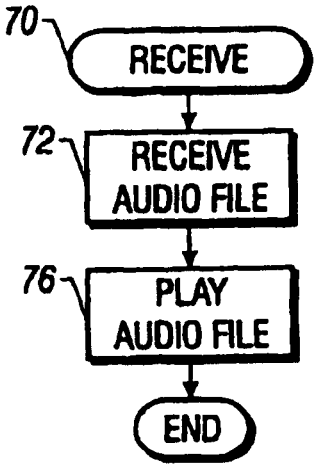
FIG. 7 is a flow chart of software at the vehicle for receiving information from the server.

The vehicle may then receive audio information in response to a previous request using the software 70 shown in FIG. 7. The audio file is received, as indicated in block 72, and may be decompressed.

In one embodiment, the server may continuously broadcast information to the vehicles. The vehicles may store this information, for example using a first in first out archiving system. A vehicle based processor may then be used to sort through the location information to identify files associated with the vehicle's current position. Those files may then be identified to the vehicle operator.

As another alternative, the vehicle may periodically send its position to the server. The server may then send files associated with the area the vehicle is currently moving through. A vehicle based processor may then identify files associated with adjacent locations.

Figure 9:
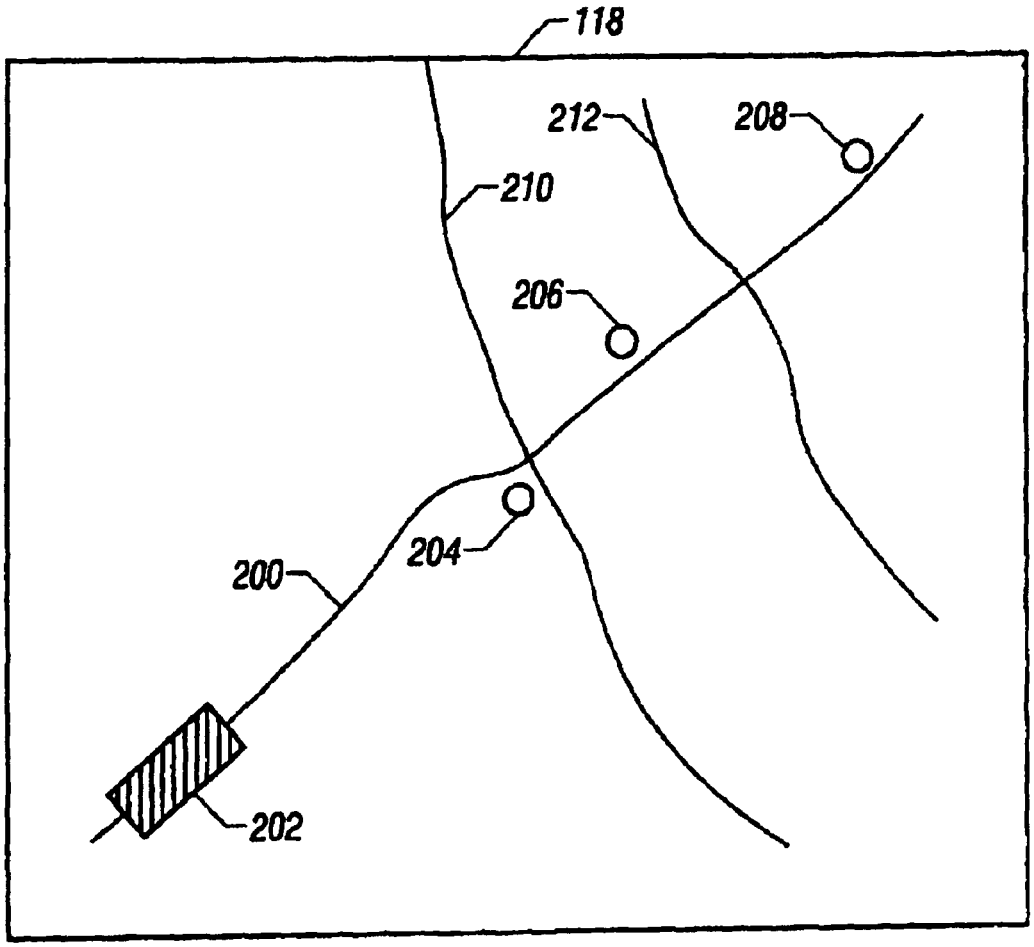
FIG. 9 is a depiction of a screen display in one embodiment of the present invention.

In one embodiment, illustrated in FIG. 9, the server may send information that may be displayed on a digital map, showing locations with associated files. Those files may then be selected when the vehicle reaches those locations or at any other time. The messages may also be played automatically based on the vehicle's position.

For example, the map that appears on a display 118 may indicate the vehicle's current position 202, and the locations 204, 206 and 208 having associated files. It may also show roads 200, 210 and 212.

In one embodiment of the present invention, the audio file May be automatically played over the vehicle's sound system (block 76). If the sound system is already in use, if desired, the existing audio may be muted in favor of an incoming audio file.

Figure 8:
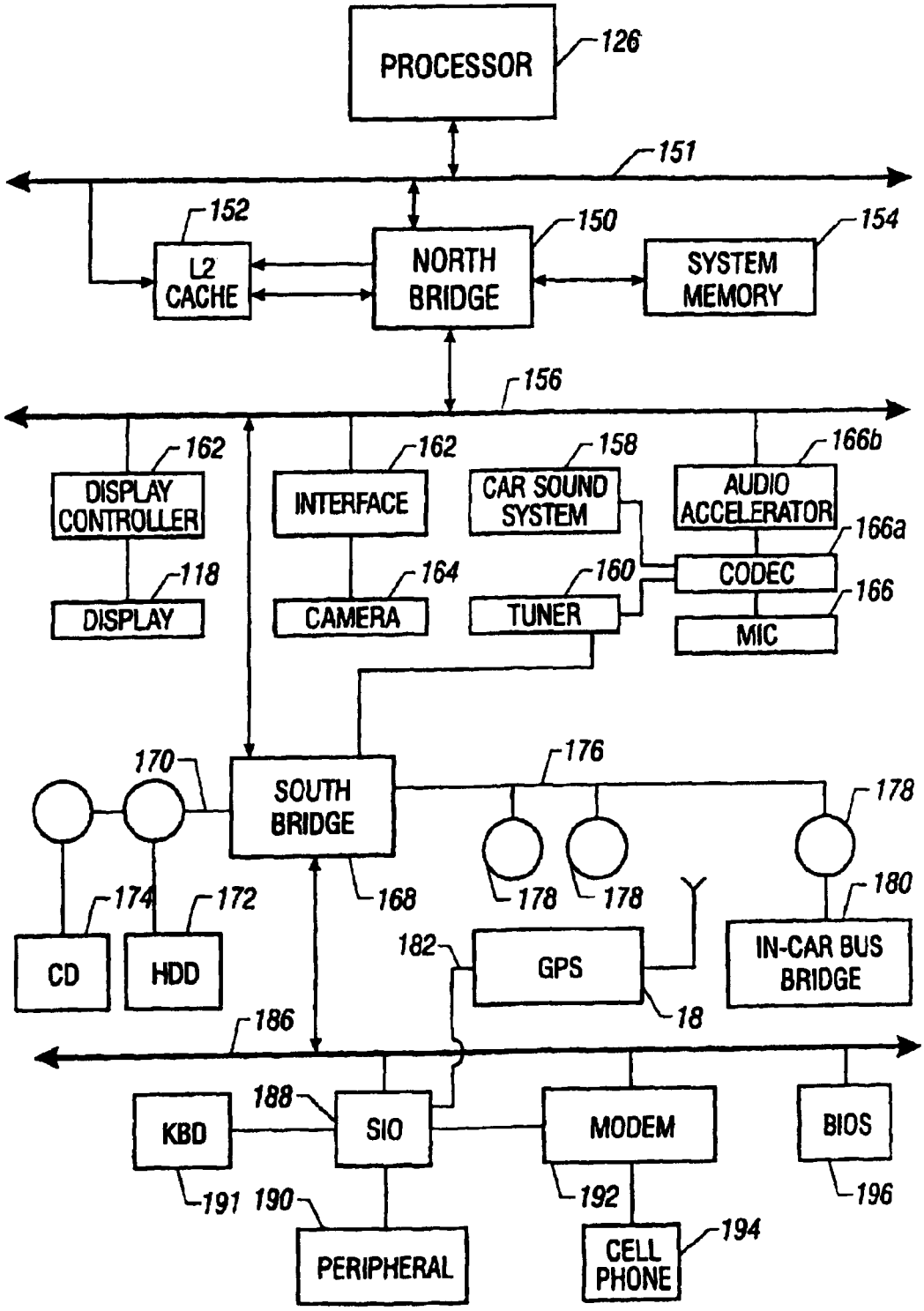
FIG. 8 is a block diagram of one embodiment for a processor-based system located in the vehicle in accordance with the embodiment shown in FIG. 1.

One embodiment of a processor-based system for implementing the capabilities previously described on a vehicle may use a processor-based system located in the vehicle's dashboard. The system illustrated in FIG. 8 may be implemented, for example, by the Intel 82430TX PCI chipset. Other processor/chipset combinations may be used as well.

The processor 126 communicates across a host bus 151 to a bridge 150, an L2 cache 152, and system memory 154. The bridge 150 may communicate with a bus 156, which could, for example, be a Peripheral Component Interconnect (PCI) bus in accordance with the revision 2.1 of the PCI electrical specification available from the PCI Special Interest Group, Portland, Oreg. 97214. The bus 156, in turn, may be coupled to a display controller 162, which may drive a display 118 in one embodiment in the invention. A digital camera 164 may be coupled through an interface 162 to the bus 156. The camera may be used to create digital images that may be sent to the server 10 which may then send them with other data to other vehicles.

A microphone input 166 may feed to the Audio Codec (AC'97) 166a, where it may be digitized and sent to memory through the audio accelerator 166b. The AC'97 specification is available from Intel Corporation (www.developer.intel-.com/pc-supp/platform/ac97). A tuner 160 may be controlled from a south bridge 168. The output of the tuner may be sent to system memory 154 or mixed in the Codec and sent to the car sound system 158. Sounds generated by the processor 126 may be sent through the audio accelerator 166b and the AC'97 Codec 166a to the car sound system 158.

The bus 156 may be coupled to a south bridge 168, which may have an Extended Integrated Drive Electronics (EIDE) coupling 170 and Universal Serial Bus (USB) coupling 176 (i.e., a device compliant with the Universal Serial Bus Implementers Forum Specification Version 1.0 [www.usb.org.]). Finally, the USB connection 176 may couple to a series of USB hubs 178. One of these hubs may couple to an in-car bus bridge 180 as illustrated. The in-car bus bridge 80 may, for example use the Controller Area Network (CAN) protocol or the Society of Automotive Engineers J1850 standard. The in-car bus provides communication between microcontrollers that control vehicle operation. The other hubs may be available for implementing additional functionality.

The EIDE connection 170 may couple to a hard disk drive 172 and a CD-ROM player 174. In sonic systems, it may be desirable to replace the hard disk drive with other memory forms. For example, a flash memory may be used in place of the drive 172. The GPS receiver 18 may be attached by a cable 182 to a serial port or on a serial I/O device 188 attached to the bus 186, as are the keyboard 191 and modem 192.

The bridge 168 in turn may be coupled to an additional bus 186, which may couple to a serial interface 188, which drives a peripheral 190, a keyboard 191, a modem 192 coupled to a cellular phone 194, and a basic input/output system (BIOS) memory 196.

The memory may be implemented, for example, by a 28F200 two megabyte Hash memory, available from Intel Corporation. The USB hubs may be implemented using 8093HX microcontrollers, available from Intel Corporation. Local firmware may be stored on EPROM memory (e.g., the 27C256 EPROM, available from Intel Corporation).

While the present invention has been described with respect to a limited number of embodiments, those skilled in the art will appreciate numerous modifications and variations therefrom. It is intended that the appended claims cover all such modifications and variations, as fall within the true spirit and scope of the present invention.

What is claimed is:

[1. A processor based system mountable in a vehicle, said system comprising:

a processor;

a position locating device coupled to said processor;

a transmitter to transmit requests for information with appended position information; and wherein said processor to determine the vehicle's current location, sort information received in response to said request based on appended position information, and identify information with appended position information corresponding to the vehicle's current location.]

[2. The system of claim 1 wherein said transmitter is a radio frequency transceiver.]

[3. The system of claim 1 wherein said transmitter is adapted to append compass information.]

[4. The system of claim 1 wherein said system is adapted to receive information previously transmitted and stored and then relayed to the vehicle, based on the vehicle's position.]

[5. The system of claim 1 wherein said transmitter is adapted to append information that identifies the transmitter.]

[6. the system of claim 1 adapted to transmit audio files.]

[7. The system of claim 1 adapted to receive audio files.]

[8. The system of claim 1 wherein said system only displays said information when the vehicle becomes proximate to a location corresponding to said appended position information.]

*9. A processor based system, said system comprising:*

*a processor;*

*a position locating device coupled to said processor;*

*a transmitter to transmit a request for information with associated position information; and*

*wherein said processor to determine the system's current location, sort information received in response to said request based on associated position information, and identify information with associated position information corresponding to the system's current location.*

*10. The system of claim 9 wherein said transmitter is a radio frequency transceiver.*

*11. The system of claim 9 wherein said transmitter is adapted to append compass information.*

*12. The system of claim 9 wherein said system is adapted to receive information previously transmitted and stored and then relayed to the system, based on the vehicle's position.*

*13. The system of claim 9 wherein said transmitter is adapted to append information that identifies the transmitter.*

*14. The system of claim 9 adapted to transmit audio files.*

*15. The system of claim 9 adapted to receive audio files.*

*16. The system of claim 9 wherein said system only displays said information when the vehicle becomes proximate to a location corresponding to said appended position information.*

*17. A method of obtaining information comprising:*

*developing a signal indicative of a position of a processor based system;*

*transmitting said signal to a base station;*

*receiving information stored at said base station associated with the system's position;*

*sorting information received from said base station based on position; and*

*identifying information received from said base station associated with the system's current position.*

*18. The method of claim 17 wherein receiving information includes receiving an audio file.*

*19. The method of claim 18, further including developing a signal indicative of the direction of travel of the system and transmitting said signal to a base station.*

*20. The method of claim 19 further including transmitting a message to said base station and automatically appending position information on said message.*

*21. The method of claim 18 further including automatically appending a system identifier on said message.*

*22. The method of claim 17 including automatically playing said audio file.*

*23. The method of claim 17 including causing the system to identify information received from the base station associated with the system's position.*

*24. The method of claim 17 including displaying information about locations that have associated information.*

*25. A non-transitory computer readable medium for storing instructions that cause a processor-based system to:*

*develop a signal indicative of the system's position;*

*transmit said signal to a base station;*

*receive information stored at said base station associated with the system's position;*

*sort information received from said base station based on system position; and*

*identify information received from said base station associated with the system's current position.*

*26. The medium of claim 25 further storing instructions that cause a processor-based system to receive an audio file.*

*27. The medium of claim 25 further storing instructions that cause a processor-based system to develop a signal indicative of the direction of travel of the system.*

*28. The medium of claim 25 further storing instructions that cause a processor-based system to transmit a message to said base station and automatically append position information on said message.*

*29. The medium of claim 28 further storing instructions that cause a processor-based system to automatically append a vehicle identifier on said message.*

*30. The medium of claim 26 further storing instructions that cause a processor-based system to automatically play said audio file over a vehicle sound system.*

* * * * *